May 7, 1935.     J. KUCHAR     2,000,179
TRAILER JACK
Filed Jan. 23, 1933     2 Sheets-Sheet 1
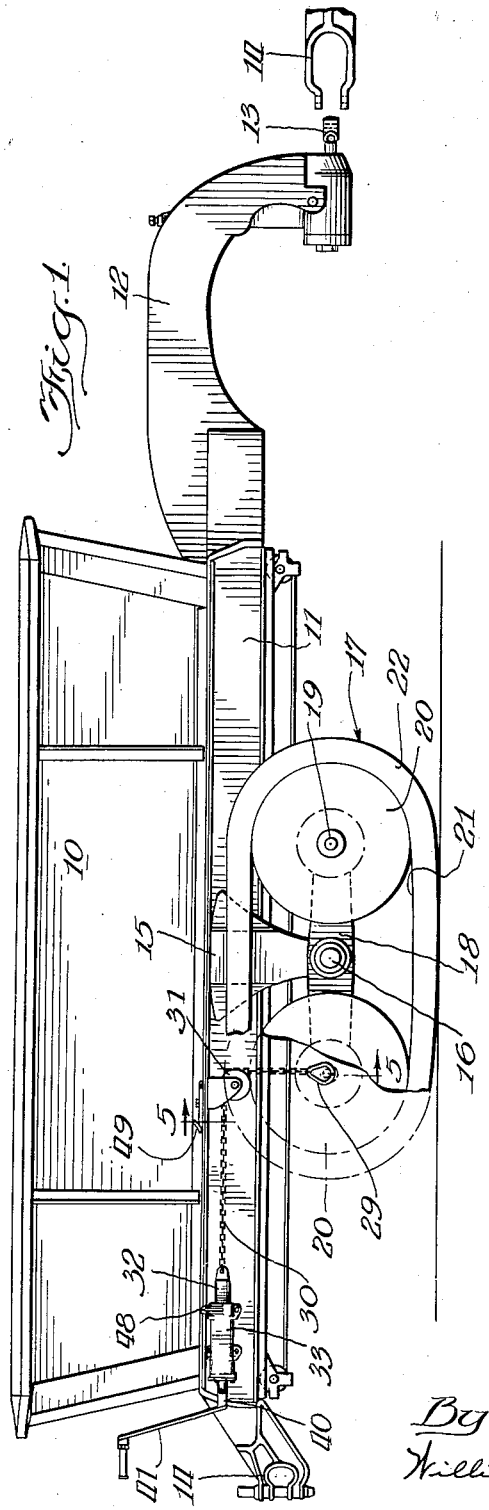
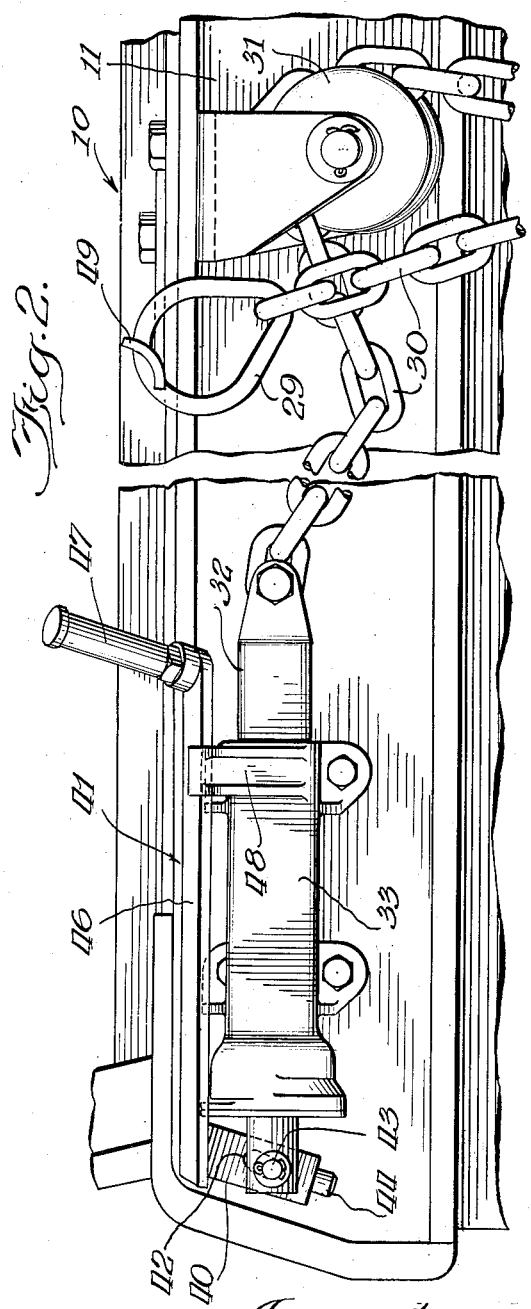
Inventor:
Joseph Kuchar
By
Williams, Bradbury, McCaleb & Hinkle
Attys.

May 7, 1935.  J. KUCHAR  2,000,179
TRAILER JACK
Filed Jan. 23, 1933    2 Sheets-Sheet 2
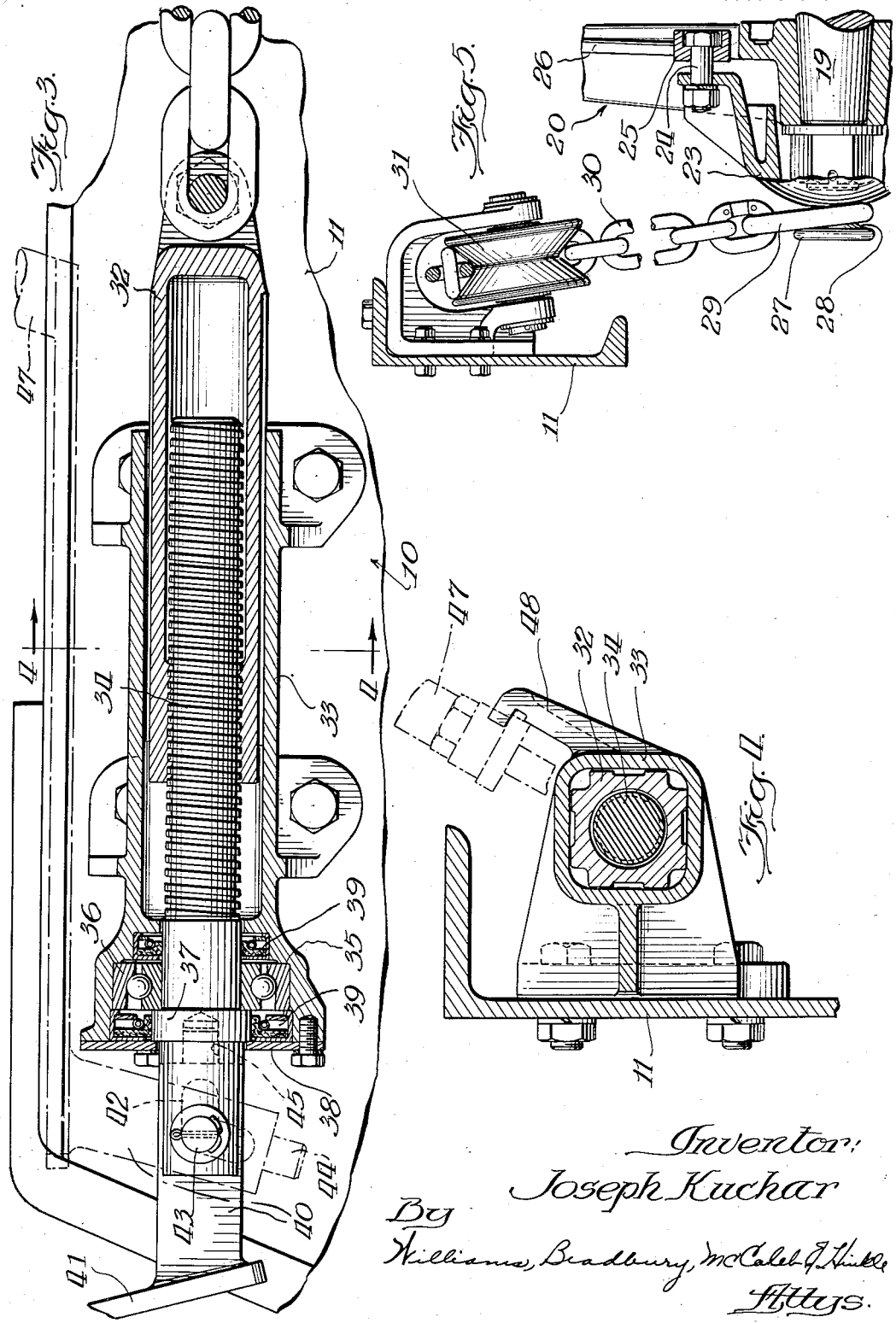
Inventor:
Joseph Kuchar
By
Williams, Bradbury, McCaleb & Hinkle
Attys.

Patented May 7, 1935

2,000,179

UNITED STATES PATENT OFFICE 2,000,179

TRAILER JACK

Joseph Kuchar, Chicago, Ill., assignor to Athey Truss Wheel Co., Chicago, Ill., a corporation of Illinois Application January 23, 1933, Serial No. 653,042

7 Claims. (Cl. 280—6)

This invention relates to trailer jacks adapted for use with trailers or wagons which are pivotally mounted upon and supported by a wheeled sub-structure other than round wheels, for example, track laying wheels.

Such trailers or wagons are usually very large and heavy, being intended to draw ten, twelve and more cubic yards of dirt over rough and swampy terrain. The draw-bar and associated parts of such trailers or wagons are very heavy, and several men are necessary to raise the forward end of the trailer or wagon for the purpose of hitching it to a tractor or another trailer.

The principal object of the present invention is to provide simple and effective means whereby such a trailer or wagon may readily be tilted about its support on the wheeled sub-structure so as to elevate the draw-bar to desired height. This device may suitably comprise means connecting a portion of the wheeled substructure to a point on the frame or body of the trailer, and force multiplying means mounted on the trailer and adapted to draw the two points together, thus causing rotation of the trailer or wagon about its pivotal support on the wheeled substructure.

The invention will readily be understood from the following description of a preferred embodiment thereof, taken in conjunction with the accompanying drawings, in which Figure 1 is a side elevation of a large-sized trailer embodying the invention;

Fig. 2 is a fragmentary elevation, on a larger scale, showing a portion of the jack mounted on the trailer body;

Fig. 3 is a longitudinal section through a portion of the jack, on a still larger scale;

Fig. 4 is a sectional detail view taken on the line 4—4 of Fig. 3; and

Fig. 5 is a sectional detail view, on a larger scale, taken on the line 5—5 of Fig. 1.

Referring to the drawings, the reference numeral 10 designates the body of a trailer which is supported on a frame comprising longitudinal beams 11. The body is provided with an arched draw-bar 12 carrying a coupling connection 13 whereby the wagon may be hitched to the clevis 14 of a tractor or another trailer.

The specific wagon shown is provided with bottom doors which are adapted to open downwardly to dump the load. It will be understood, however, that the invention is not intended to be limited to such a wagon since it is equally applicable to wagons of other types.

The trailer comprises an arched axle 15 which is provided on each side with outwardly directed stub shafts 16 upon which the wheeled sub-structures are pivotally mounted. In the specific embodiment shown the wheeled sub-structure comprises a pair of track laying wheels 17 which may suitably be of the type described and claimed in Patent No. 1,458,962, issued November 14, 1922, on an application of I. H. Athey. Such a track laying wheel comprises a beam 18 pivotally mounted on one of the stub shafts 16. The beam 18 extends substantially longitudinally and at each end carries stub axles 19 which project on either side of the beam.

Upon the axles 19 are mounted wheels 20 which are adapted to ride upon rail surfaces 21 provided by the track 22. This track 22 is flexible so as to bend in one direction but is rigid against bending in the other direction, so that the lower length between forward and rearward wheels 20 acts as a beam or inverted bridge so that the weight of the trailer or wagon, together with its load, is distributed over a large area of track on each side of the trailer. The means for trussing the track so as to obtain this result are not shown, since many conventional means are known to those skilled in the art.

It will be understood that the invention is not intended to be limited to a wheeled sub-structure of this type, since it is equally applicable to many other types of wheeled sub-structure, in fact, being applicable to all of them of which I am aware, with the sole exception of ordinary round wheels.

The tilting or elevating device is preferably connected to the wheeled sub-structure and to a point rearward of the axle 15. I prefer to make this connection at the hub of one of the rearward inside wheels 20. For this purpose I find it convenient to employ a hub cap 23 which is secured to the wheel 20 by means of three or more bolts 24. These bolts pass through a flange in the hub cap 23 and through openings in lugs 25 which engage adjacent spokes 26. The hub cap 23 is provided at its center with a head 27 which is undercut to provide a recess 28 adapted to be engaged by an enlarged link 29 at one end of a chain 30.

The chain 30 extends upwardly and passes over a sheave 31 which is mounted on one of the beams 11 at a point substantially in the same vertical plane as the head 27. The chain 30, after passing over the sheave 31, extends towards the rear end of the body 10, where it is connected to the nut element 32 which is best shown in Figs. 3 and 4.

The nut 32 has a sliding fit in a housing 33 which has a substantially square cross-section. The housing 33 is also bolted to the beam 11. The nut 32 is provided with flat faces which are adapted to engage the inner surface of the housing 33, the nut element 32 being thereby prevented from rotation.

At its rearward end the nut 32 is internally threaded so as to receive a screw 34. The screw 34 and nut element 32 are preferably provided with a square thread. At its rearward end the housing 33 opens into an enlarged portion which provides a shoulder 35. The shoulder 35 serves as an abutment for a thrust bearing 36.

The screw 34 is provided with a shoulder 37 which bears against the bearing 36. The rearward end of the housing 33 is provided with a closure plate 38 through which the screw 34 projects. Dust-excluding elements 39 are provided on either side of the bearing 36, which is preferably a ball-bearing. The closure plate 38 engages the shoulder 37 and maintains the screw 34 in assembled relation.

The rearwardly projecting end of the screw 34 is slotted longitudinally and adapted to receive within said slot the flat portion 40 of a handle 41. The flat portion 40 is provided with a slot 42 through which passes a pin 43. At its end the flat portion 40 is provided with a relatively small projection 44 which is adapted to enter into an opening 45 when the flat portion 40 is presented in alignment with the screw 34 and moved inwardly, the slot 42 permitting such movement.

The handle 41 also comprises a radial portion 46 which may also be formed of flat stock. At its end the radial portion 46 carries a conventional grip element 47. In Fig. 1 the handle is shown in operative position. After operation, the handle 41 is drawn rearwardly to remove the projection 44 from the slot 45. The handle is then folded forwardly, the housing 33 being provided with an upwardly projecting arm 48 which is adapted to support the handle in folded condition as shown in Figs. 2 and 4.

Adjacent the sheave 31 I provide a hook 49 which is adapted to support the enlarged link 29 at the end of the chain 30 when the chain is disconnected from the hub cap 23.

The operation is as follows:

Assuming the trailer or wagon shown in Fig. 1 to be disengaged from the tractor and having its draw-bar 12 tilted downwardly and resting on the ground, and that it is desired to hitch the wagon to a tractor, then the link 29 is slipped over the head 27 of the hub cap 23, the screw 34 being backed up to permit this, if necessary.

The handle 41 is moved from the position shown in Fig. 2 to the position shown in Fig. 1 and is moved forwardly slightly so as to bring the projection 44 into the recess 45 in the screw 34. The handle 34 is then rotated in counter-clockwise direction which applies tension to the chain 30. This tension tends to draw the sheave 31 towards the cap 27. The result of this drawing together is the tilting of the body 10 in a counter-clockwise direction, as viewed in Fig. 1, about the stub axle 16. The relation between the screw 34 and the nut 32 is such that they constitute a force-multiplying means so that the trailer can be tilted with very little power.

The location of the handle 41 at the rear of the wagon and one side thereof, enables the manipulator to observe the draw-bar 12 and coupling connection 13 so that the latter can be properly located with respect to clevis 14 to which it is to be connected. When the jack is located on the left-hand side of the wagon it is preferred to make screw 34 and nut 32 with left-hand threads.

After the connection has been made, the screw 34 is backed up to permit the link 29 to be released from the head 27 so that it may be connected to the hook 49. Thereafter the handle 41 is pulled outwardly and adjusted into its folded position.

It will be understood that the jack device can be employed for other purposes than the hitching of the trailer or wagon. Thus it may be used for maintaining the wagon as shown in Fig. 1, without any other support for the forward end of the wagon. It may also be employed for tilting the wagon rearwardly, which is highly advantageous in the case of wagons adapted to unload by tilting to the rear.

Although the invention has been described in connection with the specific details of a preferred embodiment thereof, it must be understood that such details are not intended to be limitative of the invention except in so far as set forth in the accompanying claims.

Having thus described by invention, I declare that what I claim is:

1. In combination, in a wagon of the cart type, a wagon body, a wheeled sub-structure on which said wagon is pivotally mounted, a flexible element connected to said wheeled sub-structure and to said body, and force multiplying means mounted on said body adapted to apply tension upon said flexible element to cause the wagon body to tilt.

2. In combination, in a wagon of the cart type, a wagon body, a wheeled sub-structure having an elongated base, said wagon body being pivotally mounted on said sub-structure, a flexible element connected to said wheeled sub-structure at a point displaced longitudinally from the pivotal axis of the body, and to said body, and a screw jack mounted on said body adapted to apply tension upon said flexible element to cause the wagon body to tilt.

3. In combination, in a wagon of the cart type, a wagon body, track laying wheel structures on which said wagon body is pivotally mounted, flexible means connected to one of said wheel structures at a point displaced longitudinally from the pivotal axis of the body, and a screw jack mounted on said body adapted to apply tension to said flexible element to cause the wagon body to tilt.

4. In combination, in a wagon of the cart type, a wagon body, track laying wheel structures on which said wagon body is pivotally mounted, each of said wheel structures comprising wheels located forwardly and rearwardly of said pivotal axis, a chain removably secured to the hub of one of said wheels, a sheave on the body over which said chain passes, and a screw jack mounted on the body and adapted to apply tension to said chain.

5. In a trailer wagon of the cart type having a drawbar normally tending to rest on the ground, a wagon body, an axle supporting same and fixed with respect thereto; a pair of track laying wheels in pivotal relation to said axle, said track laying wheels being elongated in the longitudinal direction and resisting bodily rotation about the axle, means connecting the body to one of the track laying wheels, and force multiplying means for actuating said connecting means whereby the wagon body and axle can be tilted bodily on the track laying wheels as a pivot to elevate the drawbar to a desired height.

6. In a trailer wagon of the cart type having a drawbar normally tending to rest on the ground, a wagon body, an axle supporting same and fixed with respect thereto, a pair of track laying wheels in pivotal relation to said axle, said track laying wheels being elongated in the longitudinal direction and resisting bodily rotation about the axle, means connecting a point on the body to a point of one of the track laying wheels, both points being displaced longitudinally from said axle, and force multiplying means for actuating said connecting means whereby the wagon body and axle can be tilted bodily on the track laying wheels as a pivot to elevate the drawbar to a desired height.

7. In a trailer wagon of the cart type having a drawbar normally tending to rest on the ground, a wagon body, an axle supporting same, a pair of track laying wheels in pivotal relation to said axle, said track laying wheels being elongated in the longitudinal direction and resisting bodily rotation about the axle, a flexible element connecting the body to one of the track laying means rearwardly of said axle, and force multiplying means for actuating said flexible means whereby the wagon body can be tilted bodily on the track laying wheels as a pivot to elevate the drawbar to a desired height.

JOSEPH KUCHAR.